July 16, 1929.  
O. ZERK, NOW BY JUDICIAL CHANGE OF NAME O. U. ZERK  
1,720,871  
LUBRICANT DISPENSING APPARATUS  
Filed July 5, 1923   2 Sheets-Sheet 1

OSCAR ZERK   INVENTOR.

BY Richey, Slough + Watts

HIS ATTORNEYS

July 16, 1929.  
O. ZERK, NOW BY JUDICIAL CHANGE OF NAME O. U. ZERK  
1,720,871  
LUBRICANT DISPENSING APPARATUS  
Filed July 5, 1923  2 Sheets-Sheet 2
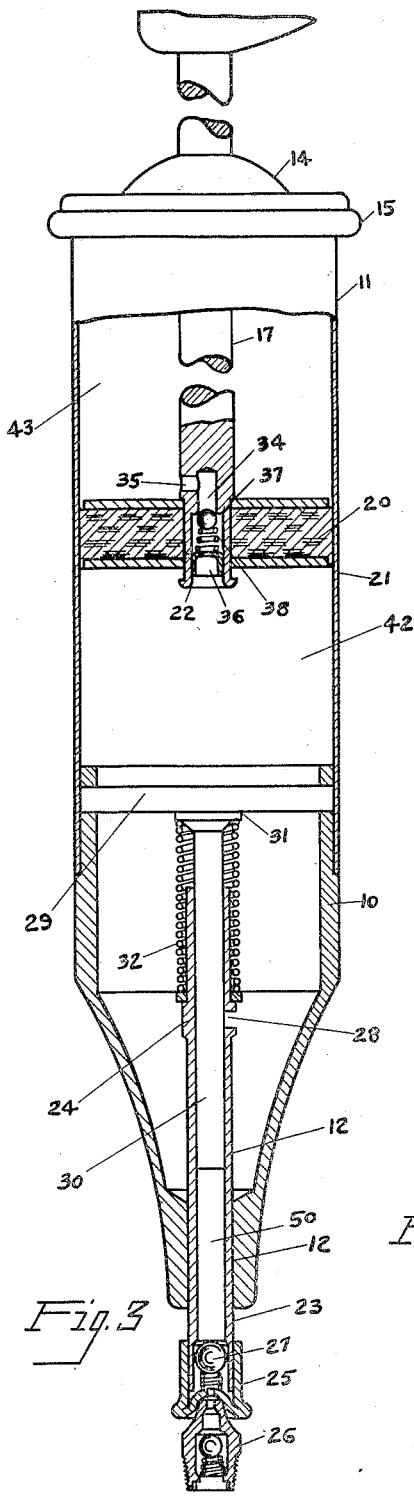
Fig. 3
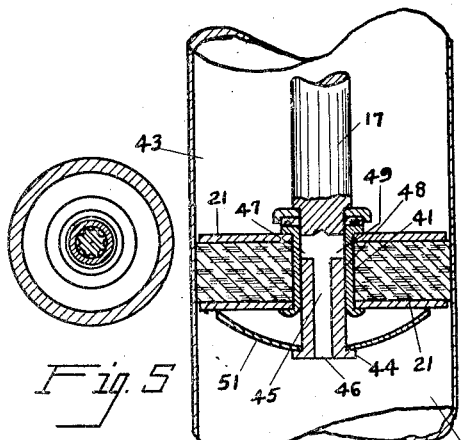
Fig. 5
Fig. 6
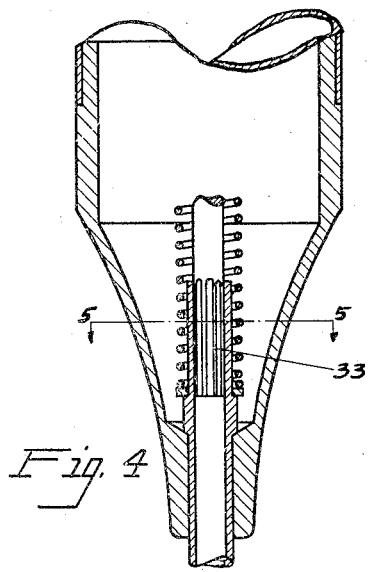
Fig. 4
OSCAR ZERK  INVENTOR
BY Richey, Slough & Watts
HIS ATTORNEYS Patented July 16, 1929.

1,720,871

UNITED STATES PATENT OFFICE.

OSCAR ZERK, NOW BY JUDICIAL CHANGE OF NAME OSCAR ULYSSES ZERK, OF CLEVELAND, OHIO, ASSIGNOR, BY MESNE ASSIGNMENTS, TO THE ALEMITE MANUFACTURING CORPORATION, OF CHICAGO, ILLINOIS, A CORPORATION OF DELAWARE.

LUBRICANT-DISPENSING APPARATUS.

Application filed July 5, 1923. Serial No. 649,704.

This invention relates to lubricant dispensing apparatus, and relates particularly to a manually operable apparatus comprising a lubricant reservoir of relatively large capacity, and a lubricant charge containing chamber of smaller capacity together with means operable in a single lubricant ejecting operation to place the lubricant in both chambers under pressure, the pressure in the said charge containing chamber being a relatively high pressure, whereby lubricant may be forcibly ejected under high pressure from such chamber and lubricant in the other chamber may be subjected to a lower pressure to insure that it will feed from the reservoir into the high pressure chamber to replace lubricant ejected therefrom.

Another object of my invention is to provide means for placing the lubricant in the two chambers of the apparatus under different pressures in a single continuous operation of the apparatus.

Another object of my invention is to provide in a single unitary structure a complete lubricating compressor which will positively eject during each manual operation a predetermined quantity of lubricant, the same being substantially independent of the consistency of the lubricant or the direction in which the apparatus is pointed.

Still another object of my invention resides in constructing the pressure creating piston of a resilient compressible material.

These and other objects will appear hereinafter.

In the drawings,

Fig. 3 is a partial similar section showing the parts when in operative position.

Fig. 4 is a partial longitudinal section of the apparatus with a modified passageway between the container and the nozzle.

Fig. 5 is a transverse section taken on line 5—5 of Fig. 4 showing the fluted plunger within the nozzle.

Fig. 6 shows a modified form of valve which I may substitute for a valve illustrated in Figs. 2 and 3.

Figures 1, 2:
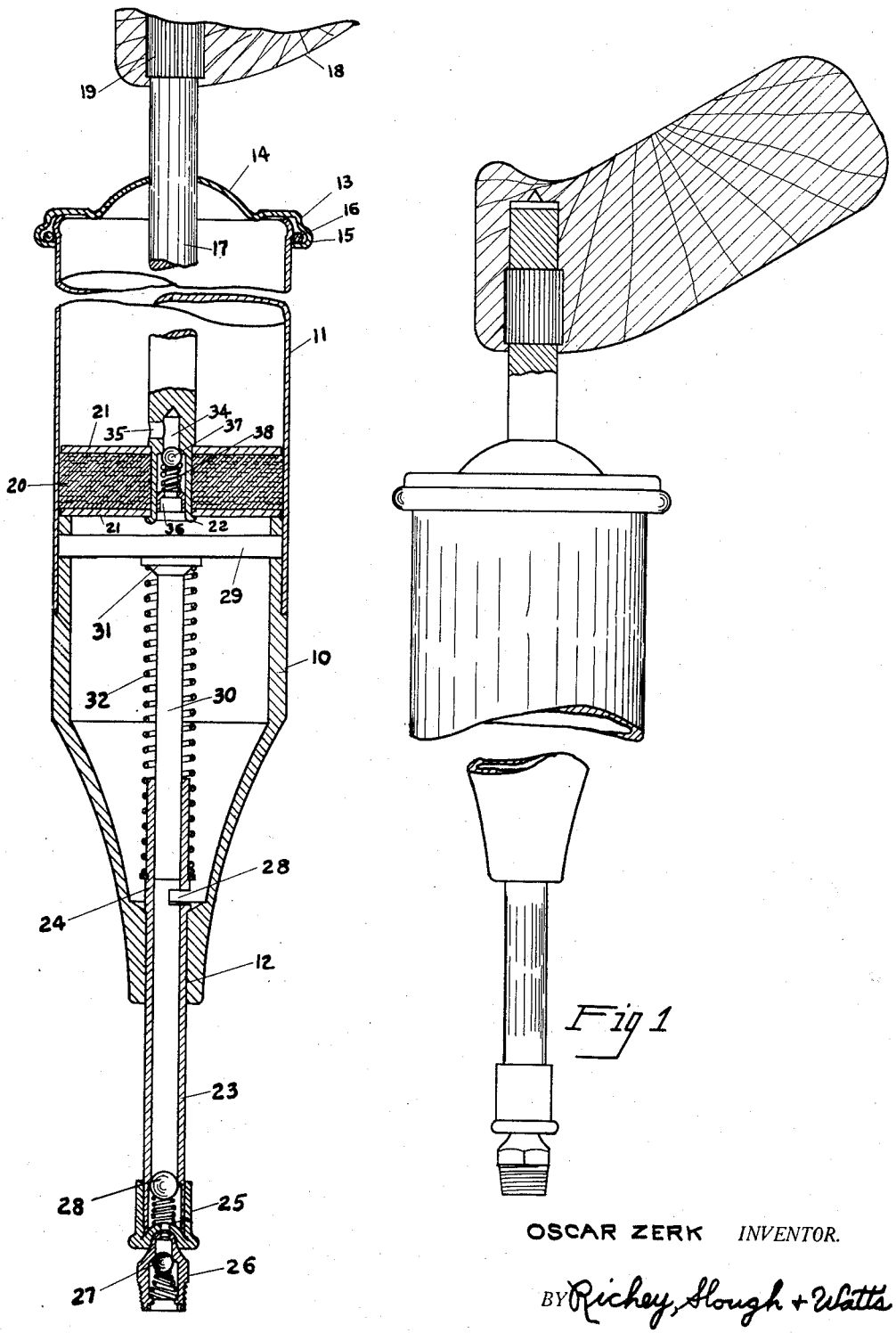
Fig. 1 is a side elevation of an embodiment of my improved lubricant dispensing apparatus.
Fig. 2 is a longitudinal sectional view of the same with the parts in normal inoperative position.

Referring to the drawings by characters of reference the lubricant container, or reservoir, is composed of two hollow members referred to as the outlet section 10 and the top section 11. The outlet section has a tubular body portion which is open at one end and which terminates in a tapered outlet end having an aperture 12 extending longitudinally through the end thereof. This section is preferably formed of cast material and the wall adjacent the open end of the body is of smaller diameter to receive the open end of the top section 11, which is preferably pressed thereon when assembled.

The top section is formed of sheet metal and the end removed from the outlet section is pressed out forming a bead 13. This end of the top section is open and a cover 14 having a beaded flange 15 closes the same. The top member is formed of resilient sheet material, and after a wire 16 has been inserted within the beaded flange 15, it is pressed over the bead 13 on the container until the wire engages the inner shoulder thereof, the resiliency of the flange retaining the wire against the bead and securing the cap thereon. The cap can be applied or removed by manual pressure, and when removed the container can be readily filled with lubricant.

A piston rod 17 is arranged to slide longitudinally through an aperture in the cap and extends into a handle grip 18 at its outer end. The rod near its end is knurled longitudinally at 19 and this portion is driven into an opening of slightly less diameter in the handle to securely retain it therewith. The end of the rod which extends within the container is reduced in diameter and receives a cork piston 20 and washers 21, which are provided with central apertures of less diameter than the larger diameter of the rod. The end of the rod is upset to provide a flange 22 which retains the piston and washers upon the reduced end thereof. The cork piston may be compressed when forced against the lubricant thereunder within the container, thereby moving upwardly in part upon the piston and expanding horizontally against the inner wall of the container. When lubricant is released from the container the compressed piston will automatically resume its normal position upon the piston rod thereby serving as a follower to create pressure upon the lubricant while the piston rod is stationary. The lateral expansion of the piston when compressed will prevent lubricant from passing between the inner wall of the container and the piston where pressure is created upon the lubricant, under which conditions the lubricant usually in prior constructions seeps up into the container above the piston.

A hollow rigid outlet nozzle 23 extends into the aperture 12 in the outlet section of the container and is telescopically arranged therewith. A peripheral shoulder 24 is provided upon the portion of the nozzle which extends into the container and prevents outward displacement of the nozzle from the container. The aperture 12 provides a long guide, or bearing in which the nozzle slides and the fit therebetween is sufficient to prevent leakage of the lubricant. A connector 25 is pressed upon the end of the nozzle forming a rigid unit and an outlet for the nozzle. The end of the connector is formed as a semispherical recessed face which when pressed against the end of a nipple will form a leak proof contact therewith. The shape of the contact face allows the apparatus to be held at various angles to the nipple 26 and retain the leak proof contact. This form of connector is described and claimed in my application filed Nov. 21, 1922, Serial No. 602,465. A self-closing valve 27 is positioned within the nozzle adjacent the contact face of the connector to normally prevent lubricant escaping therefrom. The lower edge of the shoulder on the nozzle when extended in inoperative position rests against the bottom of the outlet section of the container and an aperture 28 is provided in the nozzle thereabove, within the container to establish a passageway between the nozzle and the container when in normal inoperative position.

A transversely extending pin 29 is secured through the body of the outlet section of the container and is located adjacent the upper open end thereof. A plunger 30 extends into the end of the nozzle within the container, and the lower end thereof normally lies above the opening 28. The opposite end of the plunger terminates in a head 31 which engages the pin 29 extending across the container. A coil spring 32 surrounds the plunger engaging the head 31 at one end and the shoulder 24 on the nozzle at its other end. The spring will thus normally maintain the plunger in extended position relative to the nozzle and in engagement with the pin 29, and will also normally maintain the nozzle in extended relation with the container. When the container is pressed toward the connector the pin 29, which is rigid therewith, will press the plunger further into the nozzle closing the opening 28 and creating pressure against the lubricant so trapped within the nozzle and ejecting it therefrom.

In Figs. 4 and 5 I have shown a modified form of plunger and nozzle whereby a passageway between the container and nozzle is created and closed in a different manner. In this instance there is no opening such as 28 previously described, and the end of the plunger is fluted. The flutes 33 are formed longitudinally in the periphery of the plunger and are of sufficient length so that they extend beyond the end of the nozzle within which the plunger extends. While in inoperative normal position lubricant can pass from the container through the flutes in the piston into the nozzle, and when the plunger is pressed into the nozzle when in operation, the flutes will be covered by the nozzle shutting off the passageway and trapping lubricant within the nozzle from whence it is ejected as the plunger is moved toward the connector.

The end of the piston rod 17 is provided with a longitudinally extending passage 34, which terminates in a transverse passage 35 above the upper washer 21. An apertured bearing 36 is pressed into the lower end of the passage 34 and a ball valve 37 closes the passage. A coil spring 38 bears against the ball valve, normally maintaining it closed and is secured within the passage by the bearing 36. This valved passageway is provided to establish communication between the spaces above and below the piston to prevent the formation of a vacuum only when the piston is retracted, and to permit the free retraction of the piston as when it is desired to refill the barrel 11 with lubricant.

Assuming that the apparatus is filled with lubricant, such as grease, the mechanism is normally in non-lubricant ejecting position as shown in Fig. 2. When it is desired to eject lubricant from the apparatus, the handle 18 is grasped by the operator and the semispherical face of the connector is placed against the inlet end of the nipple, and as shown covers the same and when pressure longitudinally of the axis of the container is exerted against the handle, a leak proof contact is formed between the nipple and the connector. As pressure is increased, the piston, through the piston rod, is moved against the lubricant in the container in a direction toward the nipple, thereby compressing the piston against the lubricant and if the nozzle lubricant charge containing chamber is incompletely filled forcing a quantity thereof through the passage 28 into the nozzle. As the pressure of the piston against the lubricant is increased, the container will slide upon the nozzle toward the connector carrying the plunger therewith. The movement of the plunger will soon close the opening 28 in the nozzle shutting off the passage. Continued pressure against the handle will slide the container toward the connector until it adjoins the connector, thereby moving the plunger further into the nozzle and ejecting lubricant therefrom into the nipple. The valve 27 will be opened when sufficient pressure is developed to overcome the tension of the spring which maintains it normally closed. During this operation it will be seen that I only create pressure against the lubricant in the apparatus when in operation, so that there is no pressure to cause leakage when not in operation. The pressure of the plunger is considerably greater than that of the piston, whereby I utilize low pressure against the lubricant within the container and higher pressure against the lubricant within the nozzle.

It will be seen from the above that my improved lubricant dispensing apparatus comprises a pair of lubricant containing chambers, the one being the main lubricant reservoir and is a relatively large capacity and is adapted to be placed under a relatively low pressure during each lubricant ejecting operation, and the other chamber contained within the nozzle being a lubricant charge containing chamber only holding such a quantity of lubricant as may be largely discharged from such a chamber, under a relatively high pressure during the same single operation of the apparatus. The reservoir contains a supply of lubricant to replenish the smaller high pressure chamber as lubricant is ejected therefrom from time to time. When the lubricant is oil and the operation is accomplished by pointing the apparatus upwardly so that the nozzle is uppermost, it is plain that due to the force of gravity the oil will be contained only in the main reservoir at the beginning of the operation. The spring 32 maintaining the nozzle in distended position when pressure is directed against the handle 18 to move the piston 21 forwardly in the reservoir until such forward movement of the piston 20 has accomplished the filling of the nozzle 23 through the opening 28 whereupon the reservoir having filled the lubricant charge containing chamber, and the reservoir capacity having been reduced by the forward movement of the piston 20, the body of lubricant ahead of the piston will resist further forward movement thereof and continuing forward pressure against the handle 18 and toward the connector 25, which is shown in Figs. 2 and 3, disposed with its contact face pressed against the contact face of the nipple 26 will cause the ejection of lubricant from the charge containing nozzle 23 since such nozzle will be telescoped over the stationary plunger 30 against the power of the spring 32 which is more compressible than the body of lubricant ahead of the piston 20, and after the opening 28 is closed by the telescoping of the nozzle 23 over the plunger 30, the lubricant in the main reservoir will be placed under a relatively low pressure and the lubricant in the nozzle 23 under a much higher pressure, the pressure being substantially inversely proportional to the cross sectional area of the said plunger and the said piston.

Another decided advantage of my apparatus is that it is operated solely by the pressure of the apparatus against an element to be lubricated, wherein there is no leakage or waste of lubricant and a measured quantity is delivered during each operation.

In Fig. 6 I show a modified form of valve for interconnecting the upper chamber 43 and the lower chamber 42 of the lubricant compressor and which chambers are divided by the cork piston 20, such valves being for the purposes before described of closing the passageway between such chambers when the gun is being operated to eject lubricant into a lubricant receiving nipple, but which valve is opened when the piston rod 17 is retracted, as for instance, when it is desired to again load the barrel with a new supply of lubricant. In this embodiment of my invention which I may sometimes prefer to use, the piston rod 17 has a portion 48 of reduced diameter with an end flange 44. In this embodiment the piston end walls or the washers 21 are clamped together by a hollow rivet 41, the reduced portion 48 in the piston rod being adapted to be reciprocated within the hollow rivet 41 as a piston within a cylinder, the hollow rivet walls being of such diameter as to fit the said reduced portion snugly. The reduced piston rod portion has a passageway 45 extending from an opening 46 at the extreme end of the rod 17, the valve ports 47 and 49 adjacent the upper end of the said reduced portion 48 of the piston rod. As the piston rod 17 is forced downward as when operating the lubricant compressor for the purpose of ejecting lubricant into a nipple, the ports 47 and 49 are advanced so that they are placed by the inner walls of the hollow rivet 41 and at such time while pressure is maintained to force piston 20 toward the nozzle of the compressor all communication between the chamber 43 and the chamber 42 of the lubricant compressor will be cut off.

However, when the rod 17 is retracted as for the purpose of refilling the compressor with lubricant, the ports 47 and 49 will be recovered and will permit air to flow therethrough and through the passageway 45 and the opening 46 into the space 42 below the piston. I prefer this form of construction of valve as in some cases, certain advantages of reliability are had which cannot be had with the form of valve illustrated in the preceding figures. This form of the invention is claimed more specifically in my co-pending application, Serial No. 649,705, filed of even date herewith.

While I have described the lubricant compressor in my present invention as being operated by manual pressure applied to the end of the piston rod 17 by the operator pushing on the handle 18 and have described the mode of operation of the device as incidental to such operation, I do not desire to limit my invention as claimed to such use and mode of operation as I find I may operate the lubricant compressor herein illustrated and described in different embodiments by grasping the barrel 11 and applying pressure axial of the nozzle 23 and against the end of the nipple 26, and I find that when so operated my improved lubricant compressor will eject lubricant from the nozzle 23 into the nipple 26, and that when such pressure is relieved the nozzle 23 will be restored to its normal position wherein the port 28 leading to the interior 50 of the hollow nozzle 23 will be uncovered and when this occurs a partial vacuum existing in the passageway 30 will communicate a negative pressure to the lower portion of the chamber 42 and will cause lubricant from such chamber to be drawn into the passage 30 through the port 28, this being accomplished by the negative pressure incidental to the displacement of the piston rod 30 from the cylindrical nozzle 23, the lubricant being drawn in by what is sometimes termed "suction action" to take the place, in the passageway 30, of the nozzle 23, the ingress of air, into the passageway 30, past the ball valve 27 being prevented since the ball of such valve is at this time inserted firmly, closing the lower portion of the passageway.

At the same time when the compressor is so operated this negative pressure or so called "suction action" will be effective to draw the piston 20 down with the lubricant, the piston 20 being a movable wall in the lubricant containing chamber and will follow the lubricant in the chamber 42 towards the port 28.

It will be seen, however, that when oil is used in the compressor of my invention instead of grease, that when the compressor is operated by pointing it upwardly to contact with a nipple, above it and to eject lubricant therein, that such operation should be accomplished by pushing forwardly on the handle 18 so as to get a positive feed of lubricant into the nozzle charge containing chamber.

It will be understood that the spring 32 is to be constructed strong enough to cause the restoring of the nozzle 23 against the power of the negative pressure set up in the passageway 30 and which would tend to prevent such restoring, and also to be strong enough to maintain the nozzle 23 in distended position as when oil is used in the apparatus until the nozzle is filled with lubricant from the reservoir.

Various changes may be made in the details of construction herein described without departing from the spirit of my invention and the scope of the appended claims.

What I claim is:—

1. A lubricant dispensing apparatus comprising a lubricant container, a delivery chamber normally in open communication with said container, and means solely operable by a single application of manual pressure of said apparatus against an element to be lubricated to force lubricant from said container into said chamber, shut off communication between said container and said chamber, and eject lubricant from said chamber.

2. A lubricant dispensing apparatus comprising a container, a handle therefor, a piston movable longitudinally within said container for exerting pressure against the lubricant therein, a lubricant charge containing chamber adapted to communicate with said container, a nozzle, and a plunger adapted to shut off communication between said container and said chamber and to exert pressure to eject lubricant from said chamber through said nozzle, said plunger and piston both exerting pressure responsive to a pressure exerted against said handle when pushed toward an element to be lubricated, with said nozzle in contact therewith.

3. A lubricant dispensing apparatus comprising a container, an outlet conduit telescopically secured with said container, a nozzle at the discharge end of the conduit, a spring for normally retaining said conduit in extended position, a plunger adapted to be telescoped into said conduit and means to move said plunger within said conduit for ejecting lubricant under high pressure therefrom and through the nozzle when said container is pressed toward an element to be lubricated while said nozzle is in operative contact therewith, and means responsive to the operation of said means to place the lubricant in the container under a relatively lower pressure.

4. A lubricant dispensing apparatus comprising a container, a rigid outlet conduit telescopically secured with said container, a nozzle at the discharge end of the conduit, a spring for normally retaining said conduit in extended position, a plunger adapted to be telescoped into said conduit and means to move said plunger within said conduit for ejecting lubricant under high pressure therefrom and through the nozzle when said container is pressed toward an element to be lubricated while said nozzle is in operative contact therewith, and means responsive to the operation of said means to place the lubricant in the container under a relatively lower pressure.

5. A lubricant dispensing apparatus comprising a lubricant container, a delivery chamber in communication with said container, means operable by a single application of manual pressure of said apparatus against an element to be lubricated to force lubricant from said container into said chamber and to eject lubricant from said chamber, and a valve between said container and said chamber responsive to the operation of said means for shutting off communication between said chamber and said container.

6. A lubricant dispensing apparatus comprising a lubricant container, a delivery chamber in longitudinal alignment with said container and normally in open communication therewith, and means operable by a single application of manual pressure of said apparatus against an element to be lubricated to force lubricant from said container into said chamber, means responsive thereto to shut off communication between said container and said chamber, and other means responsive thereto to eject lubricant from said chamber.

7. A lubricant dispensing apparatus comprising a container, a handle therefor, a piston movable longitudinally within said container for exerting pressure against the lubricant therein, said piston having a valved opening therethrough, said valved opening being responsive to a retractive pull on the piston, a lubricant charge containing chamber adapted to communicate with said container, a nozzle, and a plunger adapted to shut off communication between said container and said chamber and to exert pressure to eject lubricant from said chamber through said nozzle, said plunger and piston both exerting pressure responsive to a pressure exerted against said handle when pushed toward an element to be lubricated, with said nozzle in contact therewith.

8. In a lubricant dispensing apparatus, a cylindrical lubricant containing reservoir, a tubular rigid conduit adapted to receive lubricant therefrom, a piston for the reservoir, a plunger for the conduit, said plunger and conduit adapted to be relatively telescopable, and said piston and reservoir being relatively telescopable, means responsive to a single manual operation of the apparatus to cause both sets of telescopable parts to telescope to put the lubricant in the reservoir under relatively low pressure and the lubricant in the conduit under a higher pressure, a valve to prevent flow of lubricant under pressure in said conduit from escaping into said reservoir, a lubricant nozzle adapted to make a sealed connection with a nipple, to communicate lubricant in the conduit when under pressure to the nipple.

9. A lubricant compressor comprising a low pressure cylinder having a lubricant expelling piston for contacting with the lubricant in said low pressure cylinder, and slidable substantially the entire length of said low pressure cylinder, a high pressure cylinder communicating with said low pressure cylinder and having a plunger slidable therein, said plunger forming a valve for isolating said high pressure cylinder from said low pressure cylinder and a single handle for actuating said piston and plunger to discharge lubricant from said compressor.

10. A lubricant compressor comprising a tube adapted to abut a receiving fitting, a piston slidable down the tube against the force of such abutment, a hydraulic transmission for forcing said piston home, resilient means for holding said piston out of said tube, said tube being subjected to the pressure in said hydraulic transmission when the piston is withdrawn, said hydraulic transmission being filled with the lubricant to be injected.

11. A lubricant compressor comprising a tube adapted to abut a receiving fitting, a piston slidable down the tube against the force of such abutment, a hydraulic transmission for forcing said piston home, resilient means for holding said piston out of said tube, said tube being subjected to the pressure in said hydraulic transmission when the piston is withdrawn.

12. A lubricant compressor comprising a tube adapted to abut a receiving fitting, a piston slidable down the tube against the force of such abutment, a hydraulic transmission for forcing said piston home, and resilient means for holding said piston out of said tube.

13. A lubricant compressor comprising a tube adapted to abut a receiving fitting, a piston slidable down the tube against the force of such abutment, and a hydraulic transmission for forcing said piston home.

14. A lubricant compressor comprising a tube adapted to abut a receiving fitting, a piston slidable down the tube against the force of such abutment, a hydraulic transmission for forcing said piston home, and means for holding said piston out of said tube below a predetermined pressure, said tube being subjected to the pressure in said hydraulic transmission when the piston is withdrawn, said hydraulic transmission being filled with the lubricant to be injected.

15. Lubricating equipment comprising manually portable low pressure compressing means high pressure compressing means supported by said low pressure means, said high pressure means, in the position of rest, lying open and forming a discharge outlet for said low pressure means, and connections for actuating both compressing means by a single thrust transmitted hydraulically through said low pressure and mechanically through said high pressure means, said connections including resilient means under initial tension for holding said high pressure means in the position of rest up to a predetermined force.

16. Lubricating equipment comprising low pressure compressing means, high pressure compressing means supported by said low pressure means and communicating therewith, and connections for actuating both compressing means by a single manual thrust transmitted hydraulically through said low pressure and mechanically through said high pressure means.

17. In high pressure lubricating apparatus of the class described, a portable barrel for containing a supply of lubricant, a piston therein for displacing lubricant from said barrel, a reciprocable tube extending from one end of said barrel, a lubricant nozzle connected to the outer end of said tube, a spring for urging said tube outwardly, a plunger slidable in said tube to discharge lubricant therefrom at high pressure, said plunger and tube forming valve means for controlling admission of lubricant to said tube from said barrel, and a member carried by said barrel for forcing said plunger into said tube, there being a passage past said member to establish communication between opposite sides thereof.

In testimony whereof I hereunto affix my signature this 3rd day of July, 1923.

OSCAR ZERK.